(12) United States Patent
Lin et al.

(10) Patent No.: US 11,348,557 B1
(45) Date of Patent: May 31, 2022

(54) LIGHT COMPENSATING METHOD AND COMPUTER SYSTEM THEREOF

(71) Applicants: Inventec (Pudong) Technology Corp., Shanghai (CN); Inventec Corporation, Taipei (TW)

(72) Inventors: Chun-Chi Lin, Taipei (TW); Szu-Yu Huang, Taipei (TW); Tong-Ting Wei, Taipei (TW); Jui-Hsiang Chen, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 0 days.

(21) Appl. No.: 17/199,423

(22) Filed: Mar. 11, 2021

(30) Foreign Application Priority Data

Feb. 9, 2021 (CN) .......................... 202110179097.7

(51) Int. Cl.
*G09G 5/30* (2006.01)
*G06F 9/52* (2006.01)
*H04N 7/15* (2006.01)
*G06V 10/141* (2022.01)
*G06V 20/40* (2022.01)
*G06V 40/16* (2022.01)

(52) U.S. Cl.
CPC .................. *G09G 5/30* (2013.01); *G06F 9/52* (2013.01); *G06V 10/141* (2022.01); *G06V 20/40* (2022.01); *G06V 40/172* (2022.01); *H04N 7/15* (2013.01); *G09G 2320/0626* (2013.01)

(58) Field of Classification Search
CPC .... G09G 5/30; G09G 2320/0626; G06F 9/52; G06V 10/141; G06V 20/40; G06V 40/172; H04N 7/15
See application file for complete search history.

(56) References Cited

U.S. PATENT DOCUMENTS

| | | | |
|---|---|---|---|
| 10,477,659 B1* | 11/2019 | Mazuir | G09G 5/10 |
| 2015/0358520 A1* | 12/2015 | Thimmappa | H04N 5/232411 |
| | | | 348/217.1 |
| 2016/0066393 A1* | 3/2016 | Bosua | H05B 47/175 |
| | | | 315/307 |
| 2020/0358983 A1* | 11/2020 | Astarabadi | G06V 40/171 |
| 2021/0118404 A1* | 4/2021 | Bartscherer | H04N 5/2351 |

* cited by examiner

*Primary Examiner* — Premal R Patel
(74) *Attorney, Agent, or Firm* — Winston Hsu

(57) ABSTRACT

A method of light compensating for a computer system includes utilizing a camera of the computer system to capture a profile of a user to establish a user identity; receiving a setting signal, wherein the setting signal is used for setting an environment configuration of a display device of the computer system; and controlling the display device to compensate lights according to a plurality of first modes, a plurality of second modes and the environment configuration when the user utilizes the video camera to capture images; wherein the plurality of first modes are related to a plurality of video events created by the user, and the plurality of second modes are generated according to adjustments and setups made by the user for the plurality of first modes during each light compensating process.

14 Claims, 3 Drawing Sheets

LIGHT COMPENSATING METHOD AND COMPUTER SYSTEM THEREOF

BACKGROUND OF THE INVENTION

1. Field of the Invention

The present invention relates to a light compensating method and a computer system thereof, and more particularly, to a light compensating method and a computer system for controlling a display device to compensate lights according to the environment configuration when capturing images.

2. Description of the Prior Art

The demand for using computer equipments for recording or real-time video is constantly increasing, such as filming videos, conducting video conferences, and webcasting. However, in an environment with insufficient light sources or backlights, shadows are easily generated near the user's face, which makes the portrait blurry and poor. Generally speaking, to improve the filming effect, users may purchase light compensating equipment to make up for the lack of light. In addition to increasing costs, it also takes up a certain amount of space. Moreover, the user has to manually adjust the brightness, angle, and position of the light compensating equipment, and needs to re-adjust when the light source is in a different environment, and the user may need multiple attempts to adjust to fit the best brightness.

Under this circumstance, how to effectively perform the light compensating process during filming without additional equipment or space has become one of the goals of the industry.

SUMMARY OF THE INVENTION

The purpose of the present invention is to provide a light compensating method and a computer system thereof to solve the above problems.

The present invention provides a light compensating method for a computer system, comprising utilizing a video camera of the computer system for capturing a profile of a user to establish a user identity; receiving a setting signal, wherein the setting signal is used for setting an environment configuration of a display device of the computer system; and controlling the display device to compensate lights according to a plurality of first modes, a plurality of second modes and the environment configuration when the user utilizes the video camera to capture images; wherein the plurality of first modes are related to a plurality of video events created by the user, and the plurality of second modes are generated according to adjustments and setups made by the user for the plurality of first modes during each light compensating process.

The present invention further provides a computer system, comprising a video camera; a display device; a central processing unit, coupled to the video camera and the display device; and a memory, coupled to the central processing unit, storing a program code for instructing the central processing unit to execute a light compensating method, wherein the light compensating method comprises: utilizing the video camera for capturing a profile of a user to establish a user identity; receiving a setting signal, wherein the setting signal is used for setting an environment configuration of a display device; and controlling the display device to compensate lights according to a plurality of first modes, a plurality of second modes and the environment configuration when the user utilizes the video camera to capture images; wherein the plurality of first modes are related to a plurality of video events created by the user, and the plurality of second modes are generated according to adjustments and setups made by the user for the plurality of first modes during each light compensating process.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
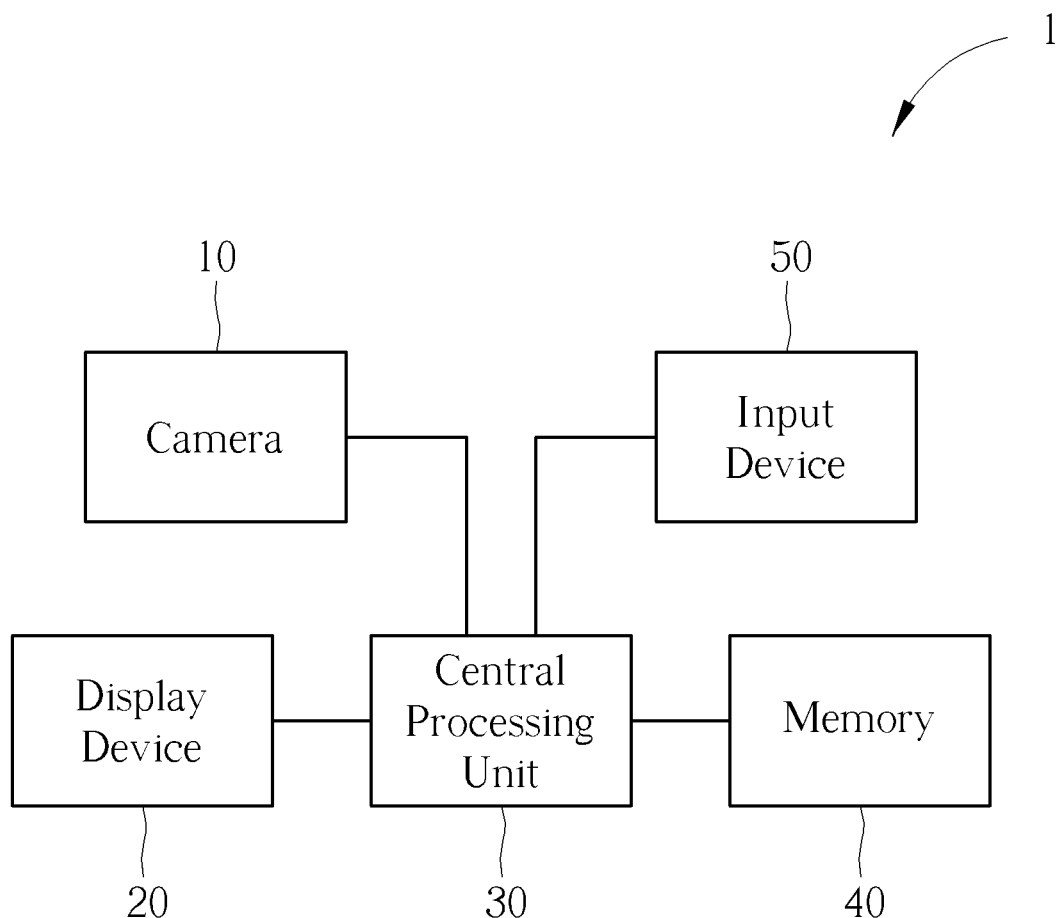
FIG. 1 is a schematic diagram of a computer system according to an embodiment of the present invention.

Please refer to FIG. 1. FIG. 1 is a schematic diagram of a computer system 1 according to an embodiment of the present invention. The computer system 1 includes a camera 10, a display device 20, a central processing unit 30, a memory 40 and an input device 50. The camera 10, the display device 20, the memory 40 and the input device 50 are coupled to the central processing unit 30, which are used to represent basic components of the computer system 1, but are not limited thereto. The memory 40 stores a program code for instructing the central processing unit 30 to execute a light compensating method, so that the display device 20 provides additional light when the camera 10 captures a video image or a profile of the user to make the image clear. It should be noted that the computer system 1 represents the necessary components required to the light compensating method, and its basic structure is well known in the art, and will not be narrated for brevity. Those skilled in the art may add other components as needed, such as the motherboard, the power supply, the cable, the microphone, the speaker, etc., but not limited thereto, or may implement the computer system 1 with appropriate devices or equipment. For example, the camera 10 may be built-in or external; the display device 20 may be multiple screens on one host, multiple external screens, or one screen with multiple windows; the input device may include a mouse, a keyboard or implemented by voice recognition via a microphone, etc.

Figure 2:
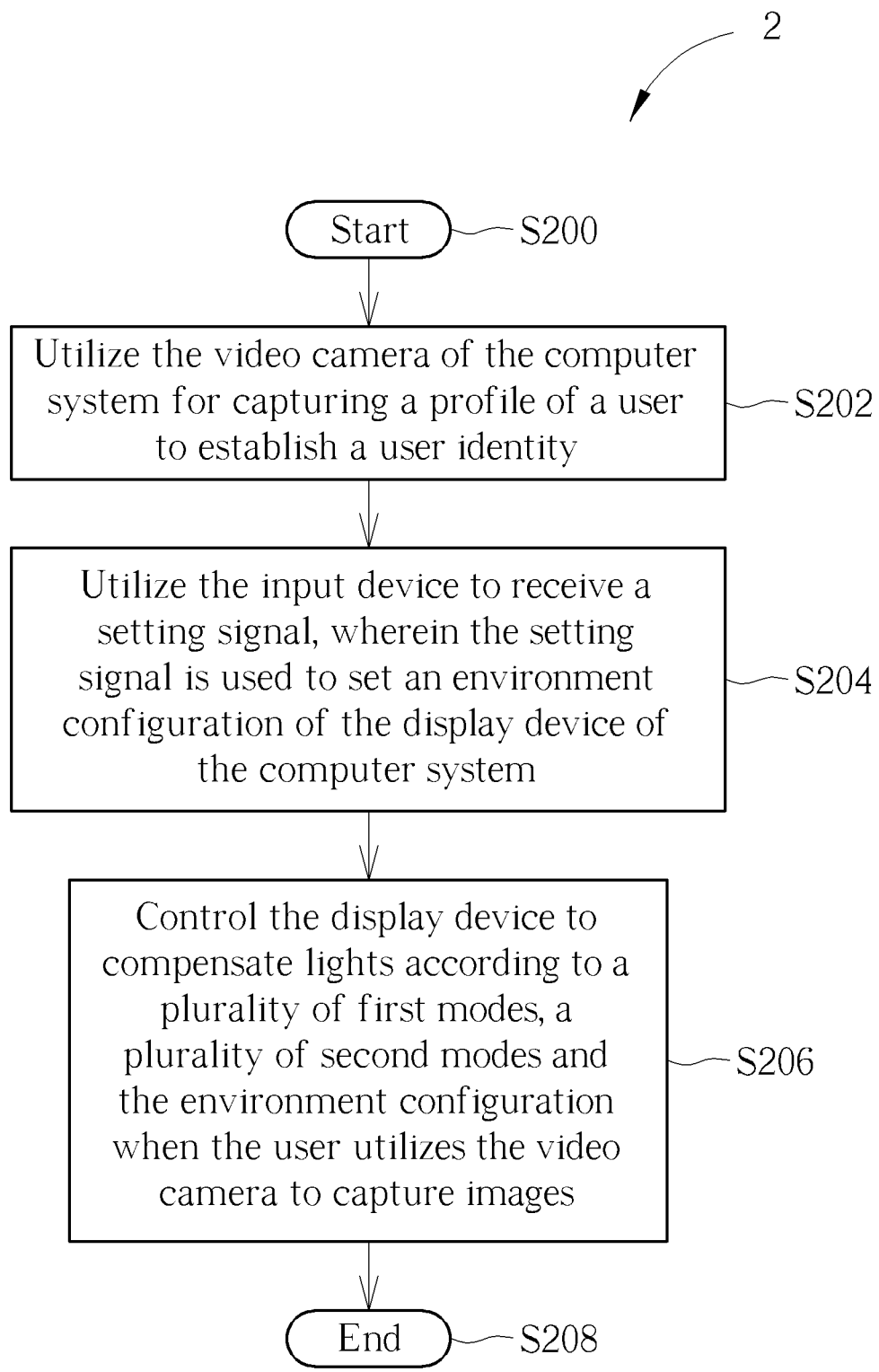
FIG. 2 is a flowchart of a process of the light compensating method of the computer system according to the embodiment of the present invention.

The light compensating method of the computer system 1 may be summarized as a process 2, as shown in FIG. 2. The process 2 includes the following steps:

Step S200: Start.

Step S202: Utilize the video camera 10 of the computer system 1 for capturing a profile of a user to establish a user identity.

Step S204: Utilize the input device 50 to receive a setting signal, wherein the setting signal is used to set an environment configuration of the display device 20 of the computer system 1.

Step S206: Control the display device 20 to compensate lights according to a plurality of first modes, a plurality of second modes and the environment configuration when the user utilizes the video camera 10 to capture images.

Step 208: End.

According to the process 2, in step S202, the camera 10 captures the profile of the user when the user uses the computer system 1 for filming the video or live broadcast. In the first execution, the user needs to input the user's basic data through the input device 50, and the computer system 1 may create and store a user identity in the memory 40 according to the profile of the user captured by the camera 10 and the basic data input by the user. In the future video or live webcasting, the computer system 1 may quickly find suitable settings according to the profile of the user captured by the camera 10 to confirm the user identity.

Figure 3:
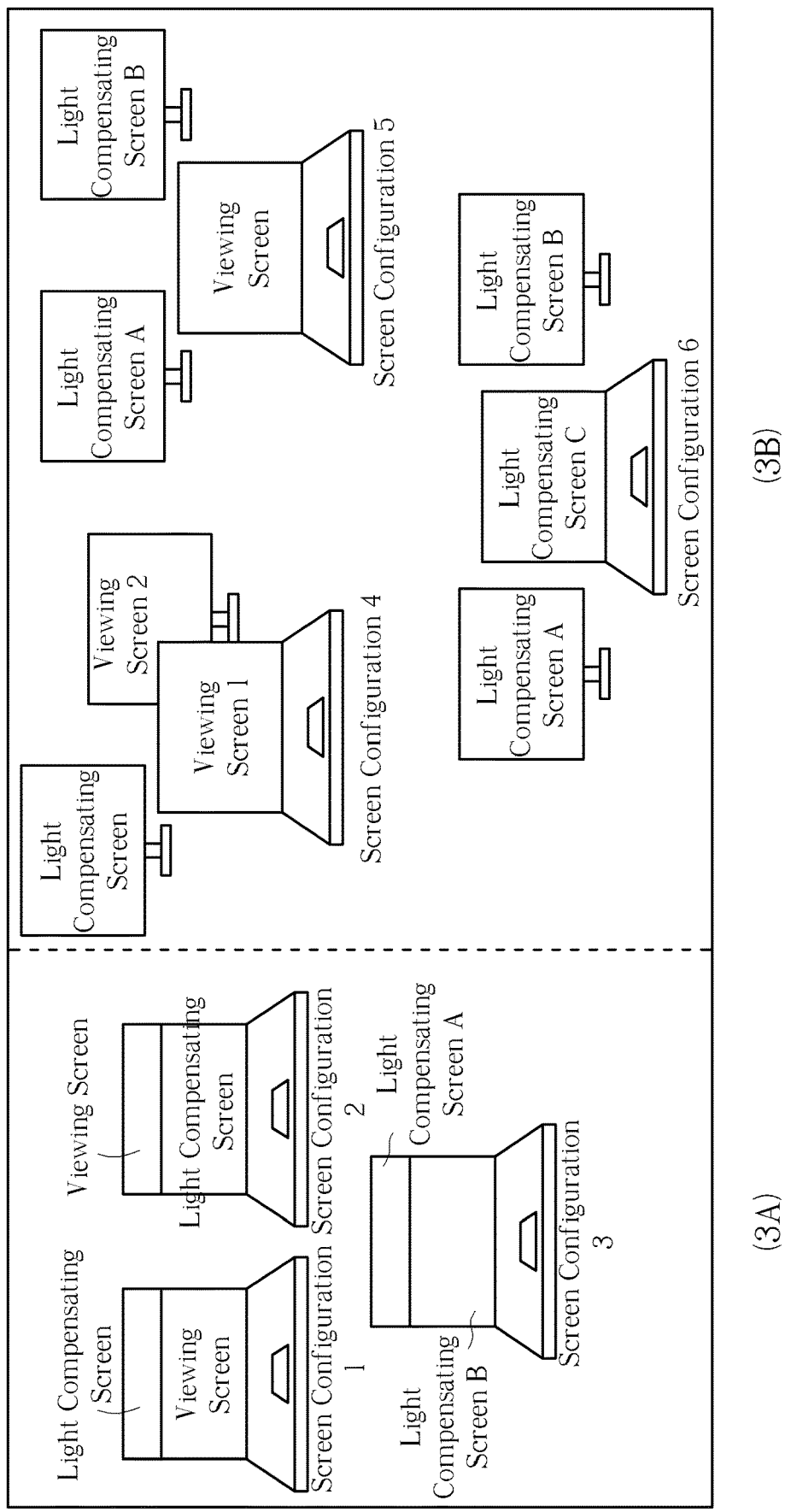
FIG. 3 is a schematic diagram of a display device according to the embodiment of the present invention.

In step S204, the computer system 1 receives the setting signal input by the user through the input device 50, and is used to set the environment configuration of the display device 20 of the computer system 1. In detail, after the computer system 1 confirms the user's identity, the user may input the environment configuration of the display device 20 through the input device 50. Because the environment configuration of the display device 20 may be related to its structure or placement, the user needs to input the corresponding setting signal. For example, as shown in FIG. 3A, an auxiliary screen is coupled to a main screen of a notebook computer (that is, multiple screens on one host). In this configuration, the main screen and the auxiliary screen may be used as a viewing screen and a light compensating screen respectively; or, both the main screen and the auxiliary screen may be used as light compensating screens, and the user further uses a handheld device (not shown in FIG. 3A) to watch video. In another example, as shown in FIG. 3B, the display device 20 may be multiple external screens; that is, one host is connected to multiple screens. Therefore, the user may input the environment configuration through the input device 50, and the environment configuration may include the screen amount, the screen size, the screen position, etc. of the display device 20 used as the viewing screen and the light compensating screen, but not limited thereto. In addition, the display device 20 may also be a screen with multiple windows. Accordingly, the user may input the environment configuration through the input device 50 to indicate the amount of windows used as the viewing window and the light compensating window, the window size, and the window position, etc., but not limited thereto.

In step S206, when the user uses the camera 10 to capture images for live webcasting or video conference, the user may first create a plurality of first modes of the plurality of video events and store the plurality of first modes in the memory 40, wherein the plurality of first modes may include at least one of a screen position, a field light source, a software program, and a screen parameter (brightness, color temperature, etc.). In the first-time use, the central processing unit 30 controls the display device 20 to compensate light according to the plurality of first modes and the environment configuration. After that, the user may adjust and set the plurality of first modes during each light compensating process to generate the plurality of second modes correspondingly and store the plurality of second modes in the memory 40, wherein the plurality of second modes may include at least one of the screen position, the field light source, the software program, and the screen parameter (brightness, color temperature, etc.). Accordingly, the central processing unit 30 controls the display device 20 to compensate light according to the plurality of first modes, the plurality of second modes, and the environment configuration to achieve a more ideal video image optimization effect.

For example, the following Table 1 is an embodiment of the plurality of first modes in the present invention. In the first use, the user may first create a live game mode, the live game mode includes screen configuration 1, the field light source is home, the software program is game software, the brightness of the screen parameters is 100%, and the color temperature of the screen parameters is warm. The central processing unit 30 controls the display device 20 to compensate light according to the live game mode and the environment configuration to achieve a more ideal video image optimization effect.

TABLE 1

| Mode code | Compensating light position | Field light source | software | Screen brightness | Screen color temperature |
|---|---|---|---|---|---|
| Game live | Screen configuration 1 | Home | Game | 100% | Warm |
| Video conference | Screen configuration 2 | Home | Skype | 90% | Warm |
| Film image | Screen configuration 3 | Home | Webcam Recorder | 80% | cold |
| . | . | . | . | . | . |
| . | . | . | . | . | . |
| . | . | . | . | . | . |

For example, the following Table 2 is an embodiment of the plurality of second modes in the present invention. The user may adjust and set the plurality of first modes to generate the plurality of second modes during each light compensating process. For example, when the live game mode is in progress, the user adjusts the screen brightness from 100% to 90%, resulting in a second live game mode. The central processing unit 30 controls the display device 20 to compensate light according to the second live game mode and the environment configuration to achieve a more ideal video image optimization effect. In another embodiment, the user adds a live streaming mode. The live streaming mode includes screen configuration 3, the field light source is home, the software is Youtube®, the brightness is 80%, and the color temperature of the screen parameter is cool. The central processing unit 30 controls the display device 20 to compensate light according to the live streaming mode and the environment configuration to achieve a more ideal video image optimization effect.

TABLE 2

| Mode code | Compensating light position | Field light source | software | Screen brightness | Screen color temperature |
|---|---|---|---|---|---|
| Game live | Screen configuration 1 | Home | Game | 90% | Warm |
| Video conference | Screen configuration 2 | office | Teams | 100% | general |
| Live streaming | Screen configuration 3 | Home | Youtube | 80% | cold |
| . | . | . | . | . | . |
| . | . | . | . | . | . |
| . | . | . | . | . | . |

In one embodiment, the present invention may synchronize a calendar of computer system 1. The user creates a first start time of each video event of the plurality of video events in the calendar. The central processing unit 30 will start to control the display device 20 to compensate light at the first start time according to the plurality of first modes, the plurality of second modes and the environment configuration. In another embodiment, the user creates a second start time of each video event of the plurality of video events. The computer system 1 inquires the user whether to perform the light compensating test at the second start time before each video event of the plurality of video events is started. When the user decides to perform the light compensating test, the central processing unit 30 will start the light compensating test at the second start time according to the plurality of first modes, the plurality of second modes and the environment configuration. The user may adjust and set the plurality of first modes or the plurality of second modes according to the experience of the light compensating test to generate the plurality of second modes or modify the plurality of second modes. The central processing unit 30 will then start to control the display device 20 to compensate light at the first start time according to the plurality of first modes, the adjusted plurality of second modes, and the environment configuration.

In one embodiment, the present invention may further include that the user uses the software of computer system 1 to optimize the effect of the video image or the profile of the user after the light compensation, for example, to beautify skin, apply makeup, change the shape of pupils, etc.

It should be noted that the computer system 1 is an embodiment of the present invention. Those skilled in the art should readily make combinations, modifications and/or alterations on the abovementioned description and examples. The abovementioned description, steps, procedures and/or processes including suggested steps can be realized by means that could be hardware, software, firmware (known as a combination of a hardware device and computer instructions and data that reside as read-only software on the hardware device), an electronic system, or combination thereof. Examples of hardware can include analog, digital and mixed circuits known as microcircuit, microchip, or silicon chip. Examples of the electronic system may include a system on chip (SoC), system in package (SiP), a computer on module (CoM) and the electronic system 1. Any of the abovementioned procedures and examples above may be compiled into program codes or instructions that are stored in the memory 40. The memory 40 may include read-only memory (ROM), flash memory, random access memory (RAM), subscriber identity module (SIM), hard disk, floppy diskette, or CD-ROM/DVD-ROM/BD-ROM, but not limited thereto. The central processing unit 30 may read and execute the program codes or the instructions stored in the memory 40 for realizing the abovementioned functions.

In summary, in an environment with insufficient light source or backlight, shadows are easily generated near the user's face, which makes the portrait blurry and poor. In the prior art, to improve the filming effect, users may purchase light compensating equipment to make up for the lack of light. In comparison, the light compensating method of the present invention may use the screen light source as a compensating light through the characteristics of multi-screen or multi-window without additional equipment or space cost. The computer system quickly selects the appropriate light compensating mode so that users have the best effect when filming videos or live webcasting.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light compensating method for a computer system, comprising:
   utilizing a video camera of the computer system for capturing a profile of a user to establish a user identity;
   receiving a setting signal, wherein the setting signal is used for setting an environment configuration of a display device of the computer system; and
   controlling the display device to compensate lights according to a plurality of first modes, a plurality of second modes and the environment configuration when the user utilizes the video camera to capture images;
   wherein the plurality of first modes are related to a plurality of video events created by the user, and the plurality of second modes are generated according to adjustments and setups made by the user for the plurality of first modes during each light compensating process.

2. The light compensating method of claim 1, further comprising synchronizing a calendar, which comprises:
   creating a first start time of each video event of the plurality of video events in the calendar, and setting a second start time of a light compensating test.

3. The light compensating method of claim 2, further comprising:
   inquiring the user whether to perform the light compensating test at the second start time before each video event of the plurality of video events is started; and
   starting the light compensating test at the second start time when the user decides to perform the light compensating test at the second start time, or starting compensating lights at the first start time when the user decides not to perform the light compensating test at the second start time.

4. The light compensating method of claim 3, further comprising modifying the plurality of first modes according to decisions made by the user related to the light compensating test.

5. The light compensating method of claim 1, wherein the display device is multiple screens on a host, multiple external screens, or one screen with multiple windows.

6. The light compensating method of claim 5, wherein the environment configuration comprises a screen amount, a screen size and a screen position of the display device used as a plurality of viewing screens and a plurality of light compensating screens.

7. The light compensating method of claim 1, wherein the plurality of first modes and the plurality of second modes comprise at least one of a screen position, a field light source, a software program and a screen parameter.

8. A computer system, comprising:
   a video camera;
   a display device;
   a central processing unit, coupled to the video camera and the display device; and
   a memory, coupled to the central processing unit, storing a program code for instructing the central processing unit to execute a light compensating method, wherein the light compensating method comprises:
      utilizing the video camera for capturing a profile of a user to establish a user identity;
      receiving a setting signal, wherein the setting signal is used for setting an environment configuration of a display device; and
      controlling the display device to compensate lights according to a plurality of first modes, a plurality of second modes and the environment configuration when the user utilizes the video camera to capture images;
      wherein the plurality of first modes are related to a plurality of video events created by the user, and the plurality of second modes are generated according to adjustments and setups made by the user for the plurality of first modes during each light compensating process.

9. The computer system of claim 8, wherein the light compensating method further comprises synchronizing a calendar, which comprises:
   creating a first start time of each video event of the plurality of video events in the calendar, and setting a second start time of a light compensating test.

10. The computer system of claim 9, wherein the light compensating method further comprises:
   inquiring the user whether to perform the light compensating test at the second start time before each video event of the plurality of video events is started; and
   starting the light compensating test at the second start time when the user decides to perform the light compensating test at the second start time, or starting compensating lights at the first start time when the user decides not to perform the light compensating test at the second start time.

11. The computer system of claim 10, further comprising modifying the plurality of first modes according to the decisions made by the user related to the light compensating test.

12. The computer system of claim 8, wherein the display device is multiple screens on a host, multiple external screens, or one screen with multiple windows.

13. The computer system of claim 12, wherein the environment configuration comprises a screen amount, a screen size and a screen position of the display device used as a plurality of viewing screens and a plurality of light compensating screens.

14. The computer system of claim 8, wherein the plurality of first modes and the plurality of second modes comprise at least one of a screen position, a field light source, a software program and a screen parameter.

* * * * *